(12) United States Patent
Chiappetta et al.

(10) Patent No.: US 6,932,365 B2
(45) Date of Patent: Aug. 23, 2005

(54) CONVERTIBLE TOY WAGON

(75) Inventors: Gary Chiappetta, Hinsdale, IL (US); Bryan Fox, Chicago, IL (US); Joel Koster, Chicago, IL (US); Hector Rodriguez, Aurora, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 10/444,411

(22) Filed: May 23, 2003

(65) Prior Publication Data

US 2004/0232639 A1 Nov. 25, 2004

(51) Int. Cl.$^7$ ............................................. B62B 3/02
(52) U.S. Cl. .......................... 280/47.371; 280/47.34; 280/47.35; 280/87.01
(58) Field of Search ..................... 280/47.34, 47.35, 280/47.36, 47.38, 47.25, 47.26, 87.01, 87.021, 47.371, 47.27; 16/260, 261, 262

(56) References Cited

U.S. PATENT DOCUMENTS

| | | | |
|---|---|---|---|
| 1,771,813 A | | 7/1930 | Norman |
| 4,449,322 A | * | 5/1984 | Blumenthal .................. 446/71 |
| 4,735,426 A | | 4/1988 | McConnell |
| 5,360,222 A | * | 11/1994 | Bro et al. ............... 280/87.021 |
| 5,538,267 A | * | 7/1996 | Pasin et al. ............... 280/87.01 |
| 5,669,617 A | | 9/1997 | Pasin et al. |
| 5,947,493 A | | 9/1999 | Pasin et al. |
| 6,318,740 B1 | | 11/2001 | Nappo |
| D458,648 S | | 6/2002 | Chiappetta et al. |
| 6,488,293 B1 | * | 12/2002 | Mitchell et al. ......... 280/47.34 |
| 6,499,750 B1 | * | 12/2002 | Michelau .................. 280/87.01 |
| 6,536,796 B1 | * | 3/2003 | Solomon ..................... 280/651 |
| D483,419 S | * | 12/2003 | Chiappetta et al. ........ D21/425 |

* cited by examiner

Primary Examiner—J. Allen Shriver
(74) Attorney, Agent, or Firm—DLA Piper Rudnick Gray Cary US LLP

(57) ABSTRACT

A convertible toy wagon includes a plastic body with side walls that define a passenger space and a bottom portion that defines a storage compartment. Horizontal seating surfaces are located fore and aft of the opening of the storage compartment. Seatbacks are pivotally attached to the wagon body and close to cover the horizontal seating surfaces and the storage compartment. A handle is pivotally attached to the front of the wagon body by a handle bracket that includes a pair of arms and an arcuate locking surface positioned therebetween. A ridge is formed on a cylindrical lower portion of the handle and interacts with the locking surface of the handle bracket so that the handle may be locked into an upright position.

20 Claims, 8 Drawing Sheets

CONVERTIBLE TOY WAGON

BACKGROUND OF THE INVENTION

This invention relates generally to toy wagons, and, more particularly, to a convertible toy wagon with folding seats and a locking handle arrangement.

A standard toy wagon for a child generally consists of a wagon body having a horizontally disposed surface or floor for supporting a child and upstanding front, rear and side walls formed around the periphery of this surface. Four wheels are attached to the bottom of the body and a handle is typically attached to either the front of the wagon body or to a pivoting bolster to which the front wheels of the wagon are attached.

In the past, wagon bodies and handles have been formed of wood, metal or combinations thereof. Recently, however, wagon bodies and handles have been made from molded plastic, such as high density polyethylene or some similar material. Such wagons are becoming increasingly popular because of their light weight, durability, corrosion resistance, lower manufacturing cost and safety.

Constructing wagon bodies from molded plastic also provides for greater flexibility in terms of product design. For example, additional storage spaces, coolers or seating may be molded into the wagon body. Examples of such wagons are presented in U.S. Pat. No. 6,318,740 to Nappo and commonly owned U.S. Pat. No. 5,538,267 to Pasin et al.

The Pasin et al. '267 patent illustrates a wagon having a storage space molded in the bottom of the plastic body. A removable panel separates the storage space from the passenger space and provides the passenger space with a flat floor. When the panel is removed, the storage space may serve as a foot well with the remaining portion of the passenger space floor serving as a seat. U.S. Pat. No. 1,771,813 to Norman shows an earlier wagon constructed of metal or wood that employs a similar concept. A disadvantage of the Pasin et al. '267 and Norman '813 patents is that the removable panel, when not in use, must be stored. In additional to taking up storage space, it may become lost. Furthermore, the wagon of the Norman '813 patent fails to provide the passenger with a back rest while the wagon of the Pasin et al. '267 patent illustrates a back rest that only provides support to a passenger's lower back.

The Nappo '740 patent also illustrates a plastic wagon with a storage space molded into the bottom of its body with a removable panel that separates the storage space from the passenger space of the wagon. Coolers are also formed on the front and rear ends of the wagon. When the panel is removed, the storage space serves as a foot well for a pair of passengers facing one another with the coolers serving as back rests. The passengers sit on the portions of the passenger space floor that remain after the panel is removed. In addition to the disadvantages associated with a removable panel described above, the back rests of the Nappo '740 patent only support the lower backs of the passengers. In addition, the provision of coolers at each end of the wagon reduces the size of the wagon passenger space.

U.S. Pat. No. 4,735,426 to McConnell illustrates a wagon that provides full back rests for the wagon passengers. This wagon, however, fails to provide foot wells for the passengers. In addition, the seats must be removed from the wagon when not in use. The seats are cumbersome and, as a result, are difficult to remove and store.

As a result, it is desirable to provide a wagon with a storage space that may be quickly and easily configured to either comfortably seat passengers or carry cargo in the storage and passenger spaces.

Wagons featuring plastic bodies and handles have been provided where the handle folds under the wagon body for ease of storage and transport. An example of such a wagon is presented in commonly owned U.S. Pat. No. 5,669,617 to Pasin et al. A metal wagon having this feature is illustrated in commonly owned U.S. Pat. No. 5,947,493 to Pasin et al. The wagons of these two patents, however, do not provide a feature whereby the handle may be locked in the upright position. Such a feature is desirable in that it locks the handle in a position that is easy for a standing individual to access and grasp.

Accordingly, it is an object of the present invention to provide a wagon that may be easily and quickly configured to either carry passengers or cargo.

It is another object of the present invention to provide a wagon that may comfortably carry passengers.

It is another object of the present invention to provide a wagon that has a handle that locks in the upright position.

It is still another object of the present invention to provide a wagon that is lightweight, durable and economical to construct.

SUMMARY OF THE INVENTION

The present invention is a toy wagon featuring a body supported by wheels with a handle bracket attached to the body. The handle bracket includes a pair of arms with an arcuate locking surface positioned therebetween. A handle having a cylindrical lower portion is pivotally attached between the pair of arms with a gap between the handle cylindrical lower portion and the locking surface. A ridge having an arcuate cross-section is positioned on the cylindrical lower portion of the handle. The ridge is sized slightly larger than the gap between the locking surface and the cylindrical lower portion of the handle so that the handle may be rotated between a locked position where the ridge is on a first side of the locking surface and the handle is in an upright position and an unlocked position where the ridge is on a second side of the locking surface. The handle is free to rotate into a storage position beneath the wagon body when the handle is unlocked.

The wagon body has front, rear and side walls defining a passenger space and a bottom portion defining a storage compartment beneath the passenger space. Horizontal seating surfaces are positioned fore and aft of an opening of the storage compartment. Seatbacks are pivotally attached to the wagon body so that they may be rotated between open and closed positions. In the closed position, the seatbacks cover the horizontal seating surfaces and the opening of the storage compartment while their backs serve as a bottom for the passenger space of the wagon. In the open position, the seatbacks support the backs of children sitting on the horizontal seating surfaces with their legs in the storage compartment.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1:
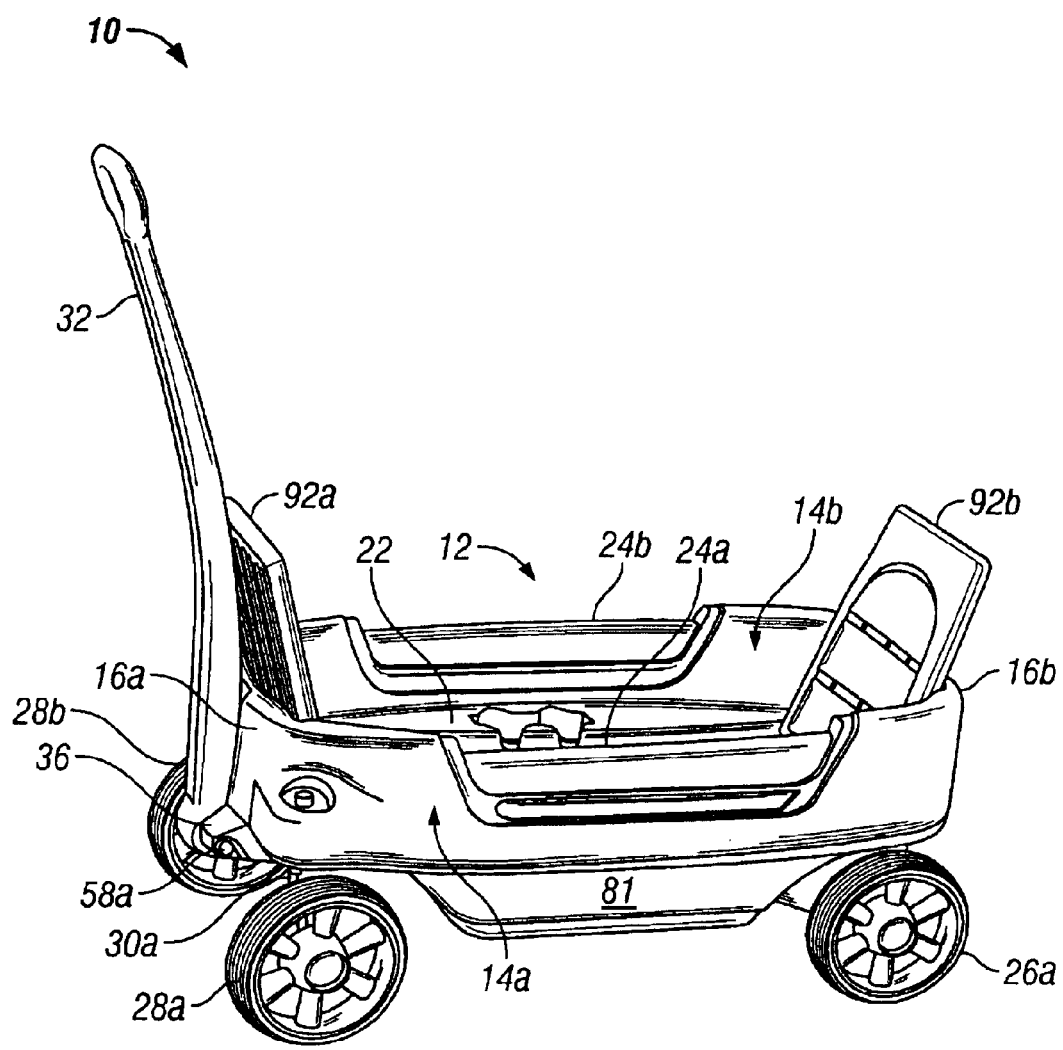
FIG. 1 is a top side perspective view of an embodiment of the wagon of the present invention with the handle in the locked position and the seat backs in the open position.
Figure 2:
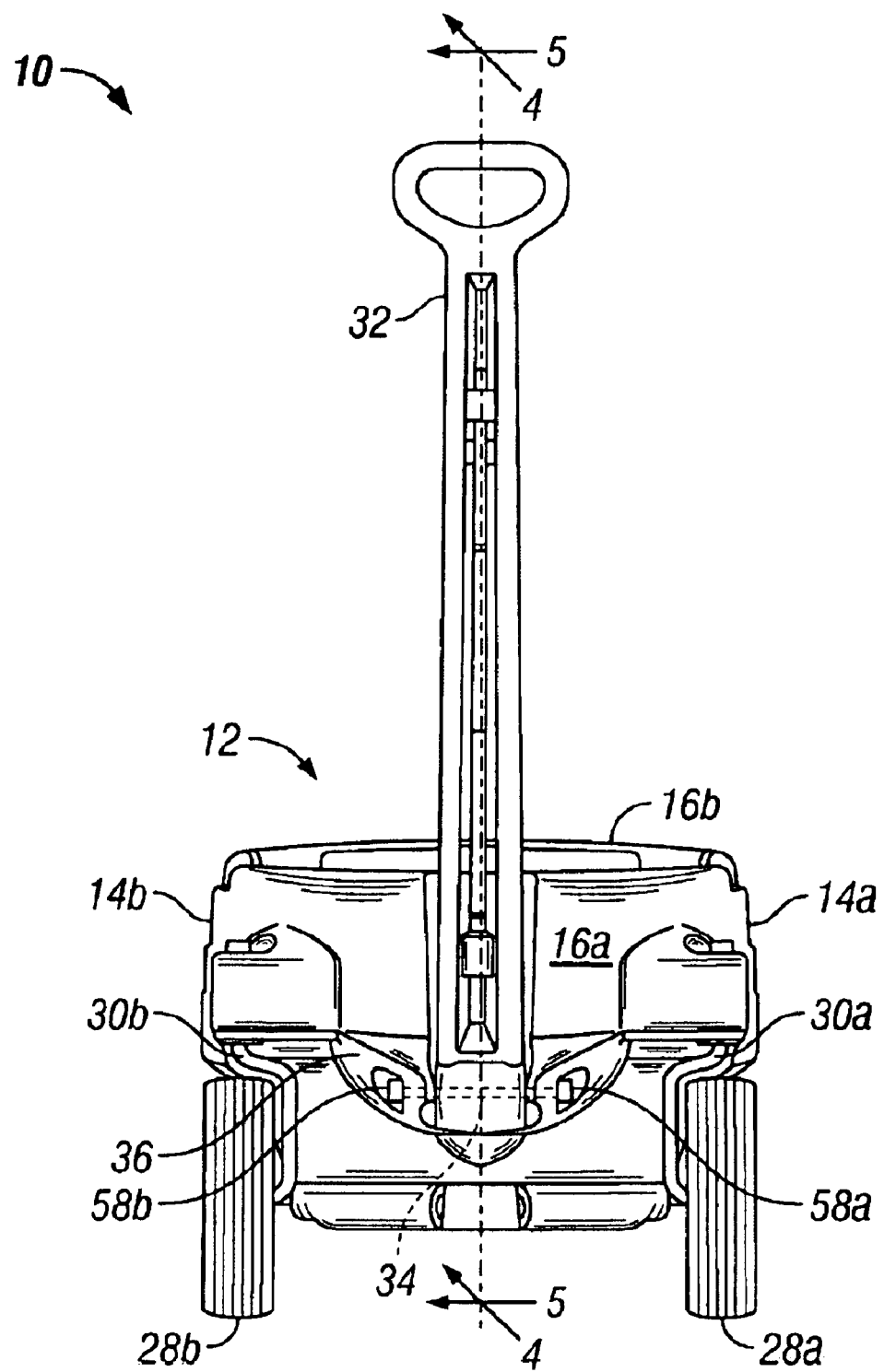
FIG. 2 is a front elevational view of the wagon of FIG. 1 with the seats folded into the closed position.

An embodiment of the wagon of the present invention is indicated in general at 10 in FIGS. 1 and 2. The wagon features a body, indicated in general at 12, that is preferably molded from high density polyethylene plastic so as to be inexpensive to manufacture and smoothly safe for a child. The wagon body features an opposing pair of side walls 14a and 14b as well as an opposing pair of front and rear walls 16a and 16b. The front, rear and side walls form the periphery of the wagon body so that a passenger space 22 is defined therebetween. The side walls may be molded with lowered portions 24a and 24b to permit ease of entry and exit by a child to and from the passenger space 22.

A pair of rear wheels 26a and 26b are attached to one another and the bottom of the back portion of the wagon body by a steel axle (not shown). A front pair of wheels 28a and 28b are attached to the front portion of the wagon body by metal members 30a and 30b so that a caster arrangement is formed. As a result, the front wheels turn independently of one another but in the same direction when the wagon is pulled on a surface so that the wagon may be steered.

A handle 32, preferably also molded from high density polyethylene plastic, is pivotally attached to the front wall 16a of the wagon body by a metal rod 34, illustrated in phantom in FIG. 2. The handle 32 is received by a handle bracket 36 molded onto the front wall 16a of the wagon body. The handle bracket is indicated in general at 36 in FIG. 3. The bottom portion of the handle is also indicated in general at 32 in FIG. 3. The handle bracket 36 features a spaced pair of arms 42a and 42b that are joined by an arcuate locking surface 44 (see also FIGS. 4A and 4B). Channels 46a and 46b and molded in each arm 42a and 42b.

Figure 3:
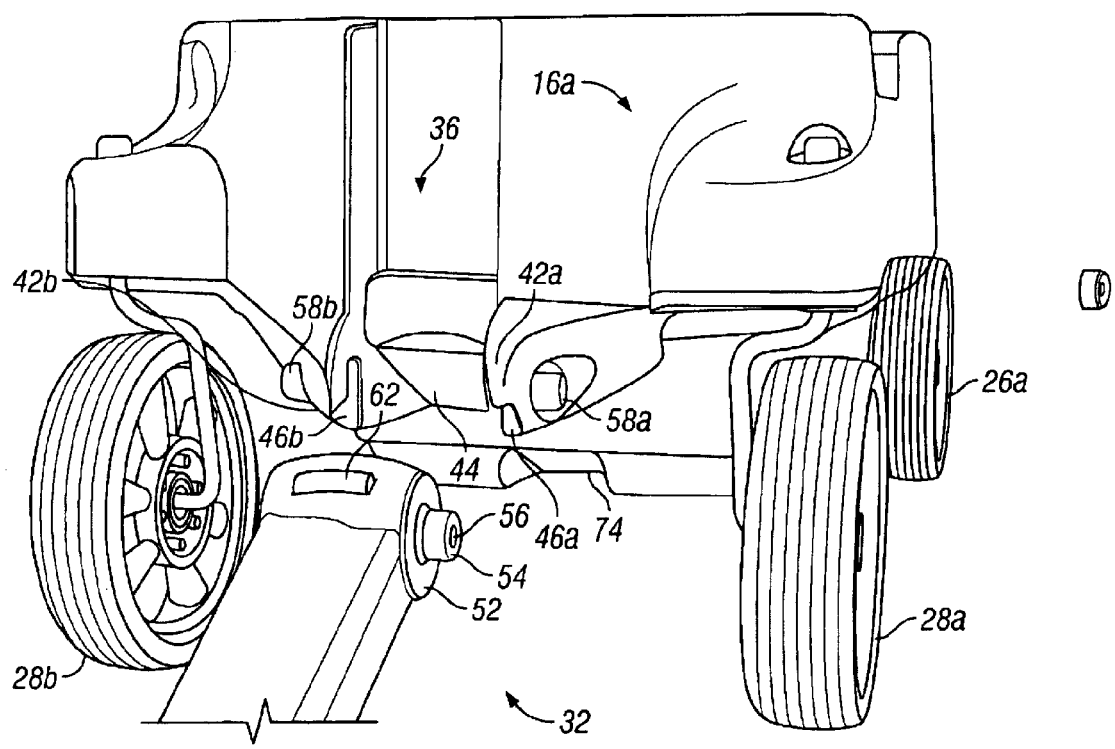
FIG. 3 is an exploded bottom front perspective view of the wagon of FIGS. 1 and 2 showing a portion of the wagon handle separated from the wagon body.

As illustrated in FIG. 3, the lower portion of the handle is configured as a cylindrical portion 52. A pair of bosses 54 are formed on opposing ends of the cylindrical portion 52 of the handle and are sized to be received in the channels 46a and 46b of the handle bracket arms 42a and 42b. A rod opening 56 is formed through the bosses 54. Corresponding rod openings are also formed in channels 46a and 46b. The handle 32 is pivotally joined to the wagon by inserting the handle bosses 54 into the handle bracket channels 46a and 46b so that the handle rod opening 56 is aligned with the openings in arms 42a and 42b. The metal rod 34 is then inserted through the aligned openings as illustrated in FIG. 2. End caps 58a and 58b are then placed over the ends of the metal rod. As described in commonly owned U.S. Pat. No. 6,499,750 to Michelau, the bosses 54 of the handle and the channels 46a and 46b of the handle bracket prevent the metal rod from tearing into the openings formed therethrough.

Figure 4A:
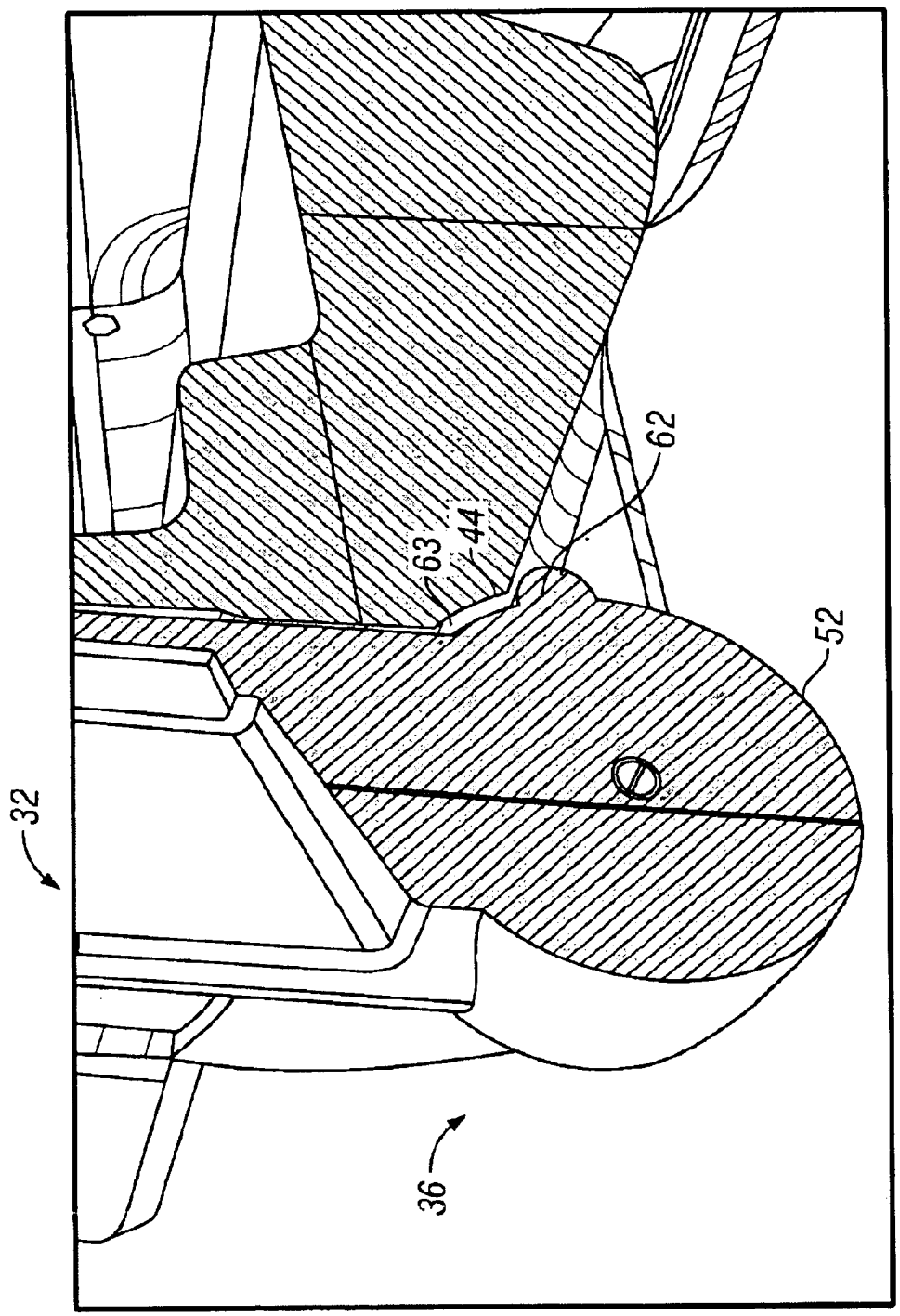
FIGS. 4A and 4B are partial sectional views of the front portion of the wagon body and the lower portion of the wagon handle taken along line 4—4 of FIG. 2 showing the wagon handle in the locked and unlocked positions, respectively.
Figure 4B:
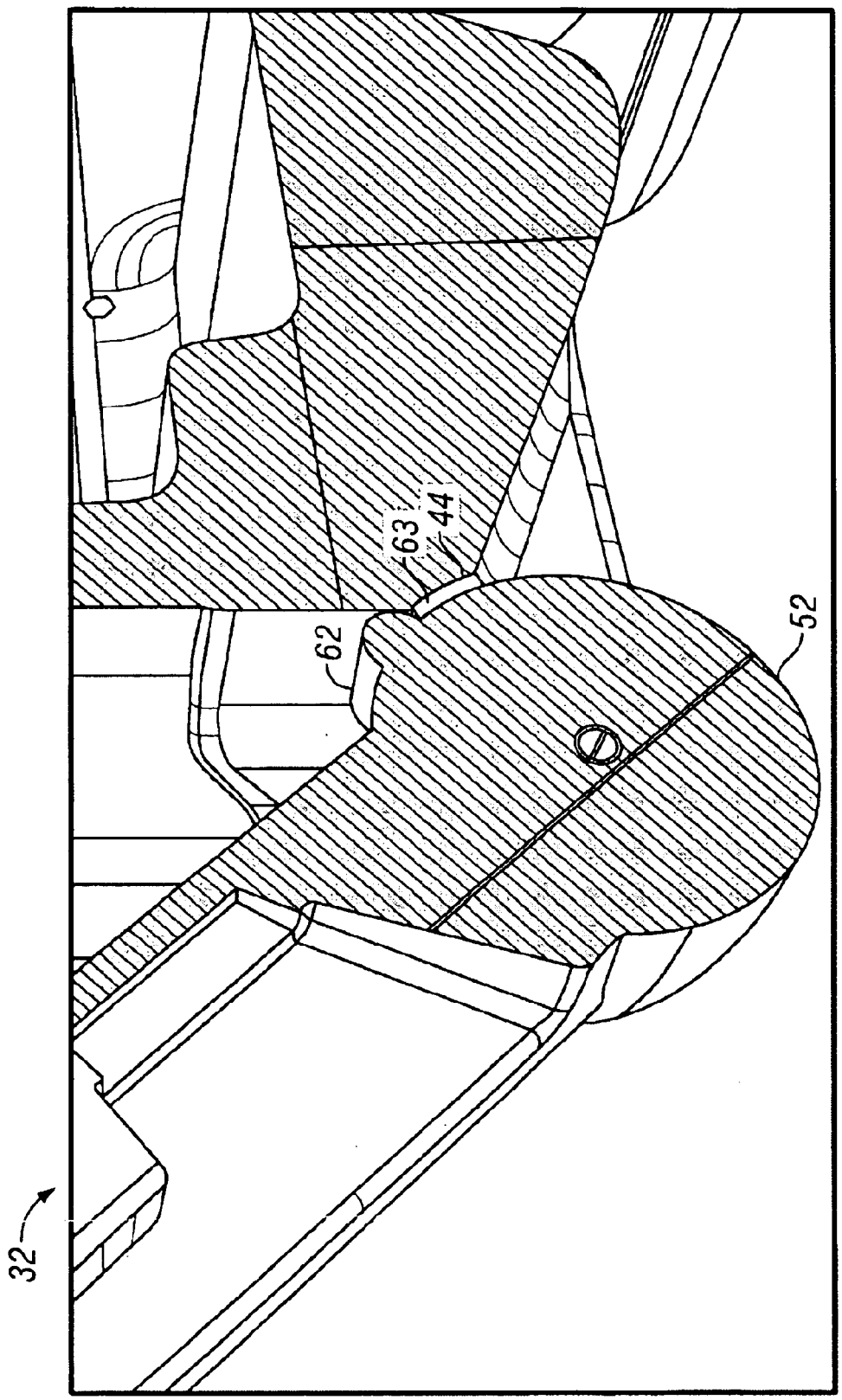

As illustrated at 62 in FIG. 3, a ridge is formed on the cylindrical portion 52 of the handle. The ridge features an arcuate cross-section. The interaction between the arcuate locking surface 44 of the handle bracket and the ridge 62 of the handle provides the wagon of the present invention with a locking handle feature. More specifically, as illustrated in FIGS. 4A and 4B, the size of ridge 62 is slightly larger than the gap 63 between the arcuate locking surface 44 and the cylindrical portion 52 of the handle 32. As a result, the handle 32 is retained or "locked" in the upright position illustrated in FIGS. 1 and 2 when the ridge 62 is in the locked position illustrated in FIG. 4A. The handle in the upright position corresponding to FIG. 4A is also illustrated at 32a in FIG. 5. When in the position 32a illustrated in FIG. 5, and in the position illustrated in FIG. 4A, the handle is free to move slightly through the shaded area 64 and may be conveniently accessed and grasped by an individual while standing.

Figure 5:
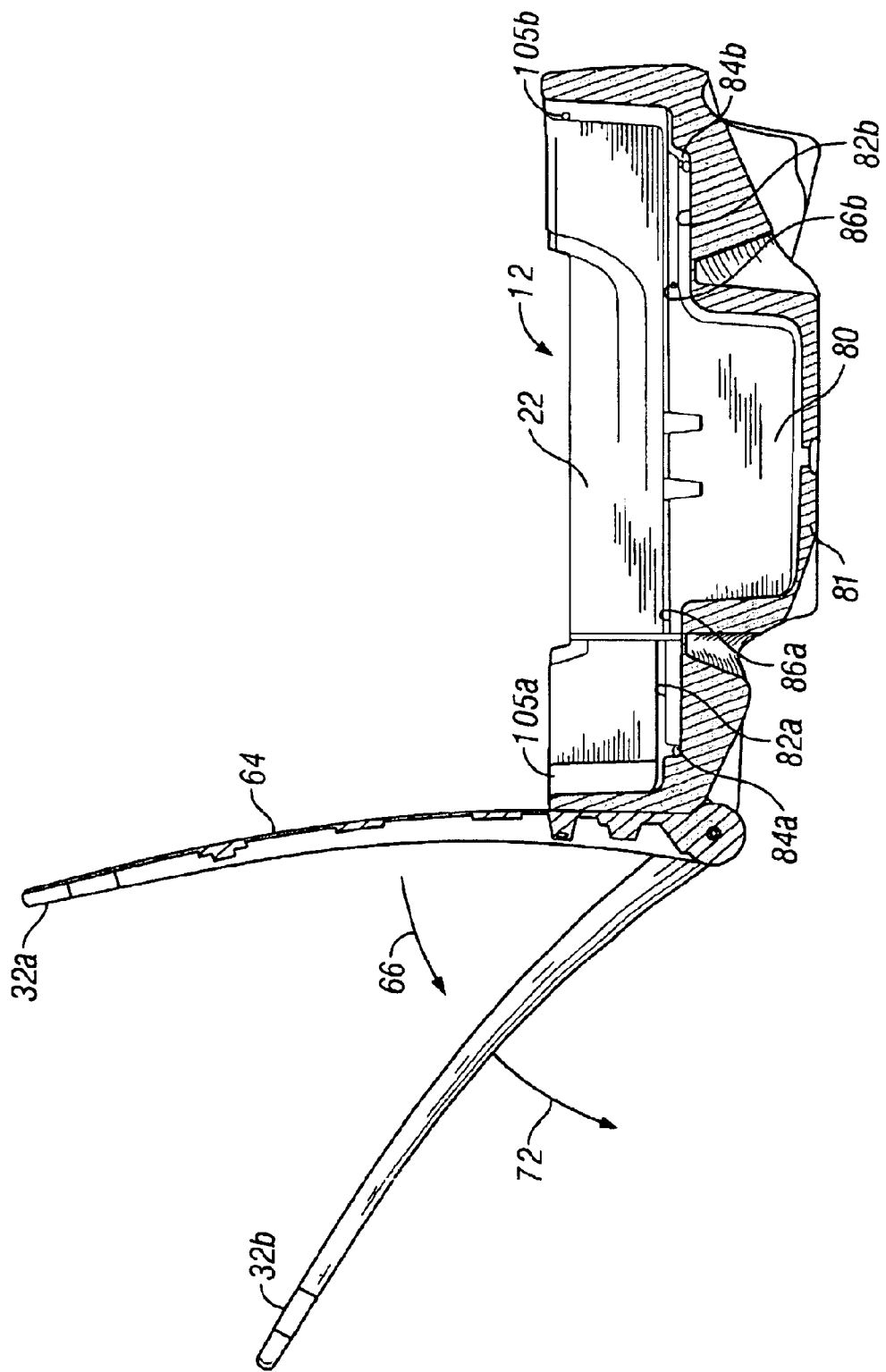
FIG. 5 is a sectional view of the wagon body and handle taken along line 5—5 of FIG. 2 illustrating the locked and unlocked handle positions.

When it is desired to pull the wagon, the handle is lowered by the individual to the position illustrated at 32b in FIG. 5. The ridge 62 and arcuate surface 44 of FIGS. 4A and 4B are both slightly compressed as the ridge 62 travels through the gap 63 between the cylindrical portion 52 and the arcuate locking surface 44 while the handle travels through the arc illustrated by arrow 66 in FIG. 5. As a result, the position 32b of the handle in FIG. 5 corresponds to the unlocked position illustrated in FIG. 4B.

Figure 6:
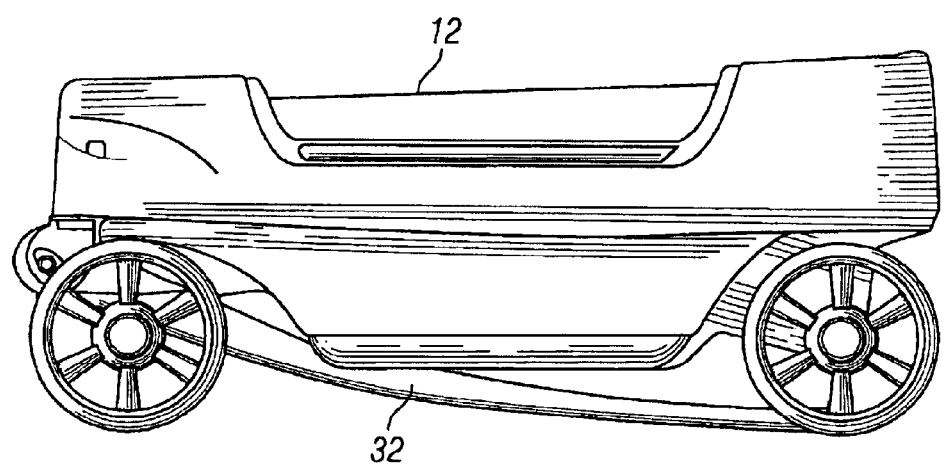
FIG. 6 is a side elevational view of the wagon of FIGS. 1–5 with the handle pivoted into the storage position and the seat backs folded into the closed position.

Once the handle is unlocked (FIG. 4B), it may be pivoted in the direction of arrow 72 in FIG. 5 into the storage configuration illustrated in FIG. 6. A cut out, indicated at 74 in FIG. 3, is formed in the bottom of the wagon and receives the handle 32 when the wagon is configured as in FIG. 6. When so configured, the wagon may be easily stowed, loaded into a vehicle (such as the trunk of a car) or otherwise lifted and handled.

Figure 7:
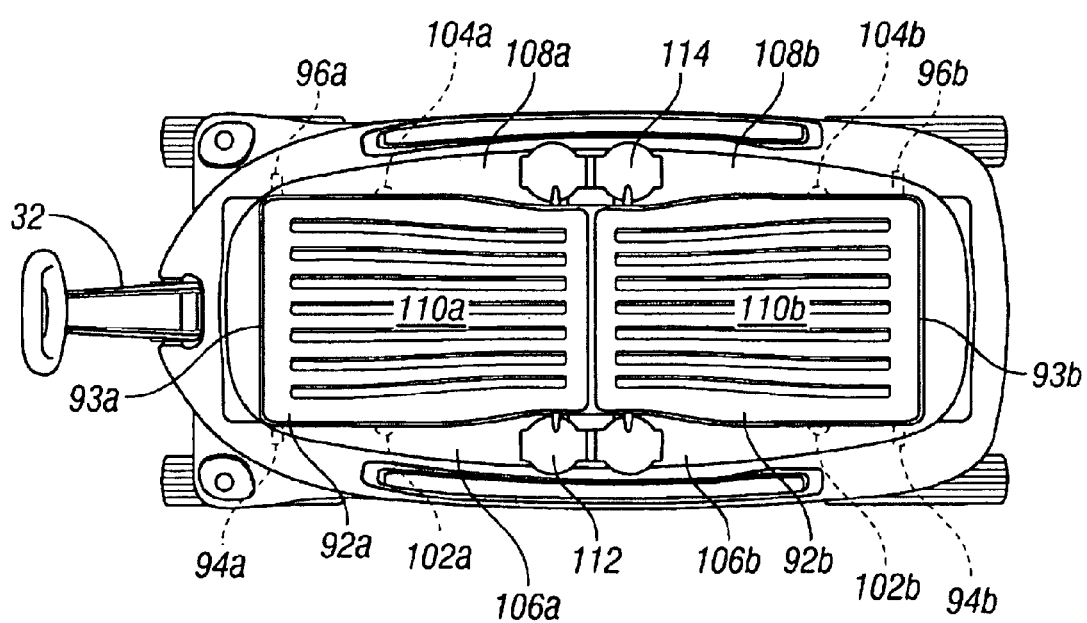
FIG. 7 is a top plan view of the wagon of FIG. 2 with the seat backs folded into the closed position.

As illustrated in FIG. 5, a storage compartment 80 is molded into the bottom portion 81 of the wagon body 12. The storage compartment is open to the top. Horizontal seating areas 82a and 82b are positioned fore and aft of the storage compartment. Seat pin holes 84a and 84b are formed in sides walls 14a and 14b of the wagon as are seatback closed locking holes 86a and 86b. A pair of seatbacks, illustrated at 92a and 92b in FIGS. 1 and 7, are pivotally connected to the wagon body. More specifically, the bottom edges 93a and 93b of the seatbacks are provided with pins, illustrated in phantom at 94a, 94b, 96a and 96b in FIG. 7, that engage the seat pin holes 84a and 84b of the wagon body. As a result, the seatbacks may pivot between the "open" position illustrated in FIG. 1 and the "closed" position illustrated in FIGS. 2, 6 and 7.

When the seatbacks are in the open position illustrated in FIG. 1, passengers may sit on the seating areas 82a and 82b in FIG. 5 and place their legs and feet in the storage area 80. As a result, the storage area 80 becomes a foot well when the seats are in the open position. When the seatbacks are in the closed position, as illustrated in FIG. 7, the seatbacks become covers for seating areas 82a and 82b and storage space 80 so that cargo stored in the latter may be covered. The passenger space 22 is also provided with a flat floor via the folded seatbacks 92a and 92b so additional cargo may be carried therein. The seatbacks are locked in the closed position via rounded nubs, illustrated in phantom at 102a, 102b, 104a and 104b in FIG. 7, that engage the seatback closed locking holes 86a and 86b of FIG. 5. When the seatbacks are in the open position, the rounded nubs engage the seatback open locking holes 105a and 105b of FIG. 5.

Arm rests 106a, 106b, 108a and 108b are molded into the wagon body and fit flush with the backs 110a and 110b of the seatbacks 92a and 92b when they are folded into the closed position. Cup holders 112 and 114 may be molded into the arm rests.

It should be noted that the handle locking feature described above with reference to FIGS. 3–5 could be incorporated into a plastic wagon having a front bolster, such as the wagon illustrated by commonly owned U.S. Design Pat. No. D458,648 to Chiappetta et al.

While the preferred embodiments of the invention have been shown and described, it will be apparent to those skilled in the art that changes and modifications may be made therein without departing from the spirit of the invention, the scope of which is defined by the appended claims.

What is claimed is:

1. A toy wagon comprising:
   a) a body supported by a plurality of wheels;
   b) a handle bracket attached to the body and including a pair of arms with a locking surface positioned therebetween;
   c) a handle having a lower portion pivotally attached between the pair of arms so that the handle is limited to rotational movement only with respect to the bracket and with a gap between the handle lower portion and the locking surface; and
   d) a ridge positioned on the lower portion of the handle, said ridge sized slightly larger than the gap between the locking surface and the lower portion of the handle so that said handle may be rotated in an interfering fashion between a locked position where the ridge is on a first side of the locking surface and the handle is in an upright position and an unlocked position where the ridge is on a second side of the locking surface.

2. The toy wagon of claim 1 where the handle is free to rotate into a storage position beneath the wagon body when the handle is unlocked.

3. The toy wagon of claim 1 where the locking surface is arcuate.

4. The toy wagon of claim 3 where the lower portion of the handle is configured as a cylindrical portion.

5. The toy wagon of claim 4 wherein the ridge has an arcuate cross section.

6. The toy wagon of claim 1 where the lower portion of the handle is configured as a cylindrical portion.

7. The toy wagon of claim 1 wherein the lower portion of the handle is pivotally connected to the pair of arms by a metal rod.

8. The toy wagon of claim 7 wherein said pair of arms have channels formed therein and the lower portion of the handle has bosses on opposing sides that surround the metal rod and engage the channels.

9. The toy wagon of claim 1 wherein the ridge has an arcuate cross section.

10. The toy wagon of claim 1 where the wagon body and handle are constructed of plastic.

11. The toy wagon of claim 1 further wherein said ridge extends radially outward relative to an axis of rotation of the handle.

12. A toy wagon comprising:
    a) a body having front, rear and side walls defining a passenger space with a bottom portion defining a storage compartment beneath the passenger space;
    b) a first horizontal seating surface positioned adjacent to an opening of storage compartment;
    c) a first seatback pivotally attached to the wagon body so that said first seatback may be rotated between a closed position where it covers the first horizontal seating surface and at least a portion the opening of the storage compartment while a back of the first seatback serves as a bottom for the passenger space of the wagon and an open position where the first seatback supports the back of a first individual sitting on the first horizontal seating surface with their legs in the storage compartment; and
    d) said first seatback including rounded nubs attached to opposing side edges, said rounded nubs engaging seatback open locking holes and seatback closed locking holes formed in the wagon body to lock the first seatback in the opened and closed positions, respectively.

13. The toy wagon of claim 12 wherein the seatback includes bottom edges to which pins are attached for pivotally mounting the seatback to the wagon body.

14. The toy wagon of claim 12 wherein said wagon body includes armrests positioned on opposite sides of the first horizontal seating surfaces.

15. The toy wagon of claim 14 wherein cup holders are molded into the arm rests.

16. The toy wagon of claim 12 wherein the wagon is constructed from plastic.

17. A toy wagon comprising:
    a) a body having front, rear and side walls defining a passenger space with a bottom portion defining a storage compartment beneath the passenger space;
    b) a first horizontal seating surface positioned adjacent to an opening of storage compartment;
    c) first seatback pivotally attached to the wagon body so that said first seatback may be rotated between a closed position where it covers the first horizontal seating surface and at least a portion the opening of the storage compartment while a back of the first seatback serves as a bottom for the passenger space of the wagon and an open position where the first seatback supports the back of a first individual sitting on the first horizontal seating surface with their legs in the storage compartment; and
    d) a second horizontal seating surface and a second seatback, said second horizontal seating surface positioned adjacent to the opening of the storage compartment on a side opposite of the first horizontal seating surface and the second seatback pivotally connected to the wagon body so that the second seatback may be rotated between a closed position where it covers the second horizontal seating surface and at least a portion the opening of the storage compartment while a back of the second seatback serves as a bottom for the passenger space of the wagon and an open position where the second seatback supports the back of an individual sitting on the horizontal second seating surface with their legs in the storage compartment.

18. The toy wagon of claim 17 where the first and second horizontal seating surfaces are positioned fore and aft of the opening of the storage compartment.

19. The toy wagon of claim 17 wherein said wagon body includes armrests positioned on opposite sides of the first and second horizontal seating surfaces.

20. The toy wagon of claim 19 wherein cup holders are molded into the armrests.

* * * * *